United States Patent [19]

Amshoff, III

[11] Patent Number: 4,774,875
[45] Date of Patent: Oct. 4, 1988

[54] ACTUATOR SEAL ARRANGEMENT

[75] Inventor: Herman J. Amshoff, III, Louisville, Ky.

[73] Assignee: Turn Act Inc., Jeffersontown, Ky.

[21] Appl. No.: 87,335

[22] Filed: Aug. 20, 1987

[51] Int. Cl.$^4$ .............................................. F01C 9/00
[52] U.S. Cl. ....................................... 92/122; 92/125; 277/81 P; 277/96.1
[58] Field of Search ................. 92/120, 121, 122, 125; 277/81 P, 181, 189, 96.1; 418/149

[56] References Cited

U.S. PATENT DOCUMENTS

| | | | |
|---|---|---|---|
| 4,009,644 | 3/1977 | Higuchi et al. | 92/125 |
| 4,474,105 | 10/1984 | Eicher et al. | 92/122 |
| 4,475,738 | 10/1984 | Eicher et al. | 92/122 X |
| 4,495,856 | 1/1985 | Sollami | 92/125 |
| 4,565,119 | 1/1986 | Higuchi | 92/125 |

Primary Examiner—Robert E. Garrett
Assistant Examiner—Mark A. Williamson
Attorney, Agent, or Firm—Edward M. Steutermann

[57] ABSTRACT

A seal arrangement for use in a rotary actuator having a housing and an end wall where a shaft extends through an aperture in the end wall and and carries a vane, a stator assembly is provided and directly inwardly from the housing having an end edge in adjacent relation with the end wall and a longitudinal edge adjacent the shaft. A groove is provided extending longitudinally along the end edge and the longitudinal edge and is adapted to receive a generally rectangular stator seal member so the stator seal member end edge abuts the end wall to provide a fluid seal therebetween and where an annular groove is provided around the shaft receiving aperture and is adapted to receive a generally circular ring seal. The generally circular "O" ring seal includes a tab member having a thickness less than the thickness of the "O" ring member and the tab extends radially outwardly from the "O" ring member parallel to the groove of the end edge to engage the stator seal member.

5 Claims, 3 Drawing Sheets

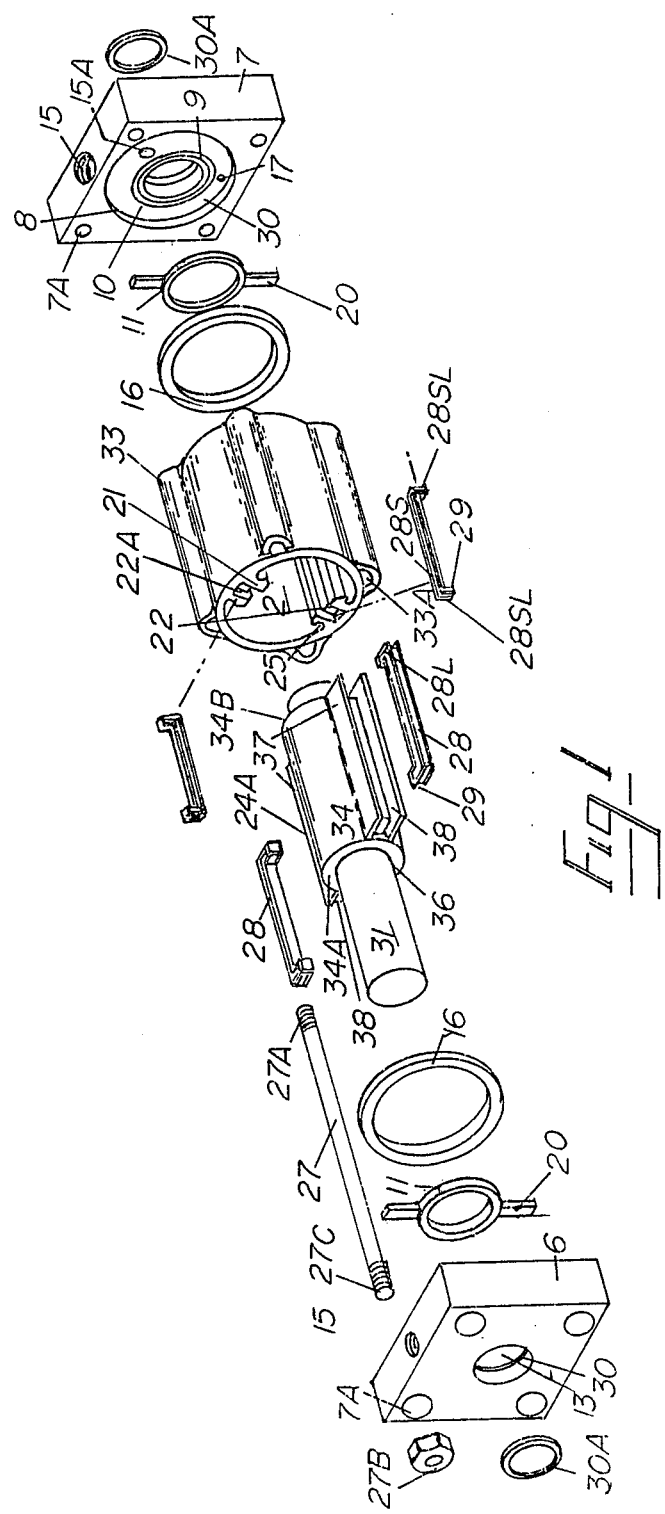

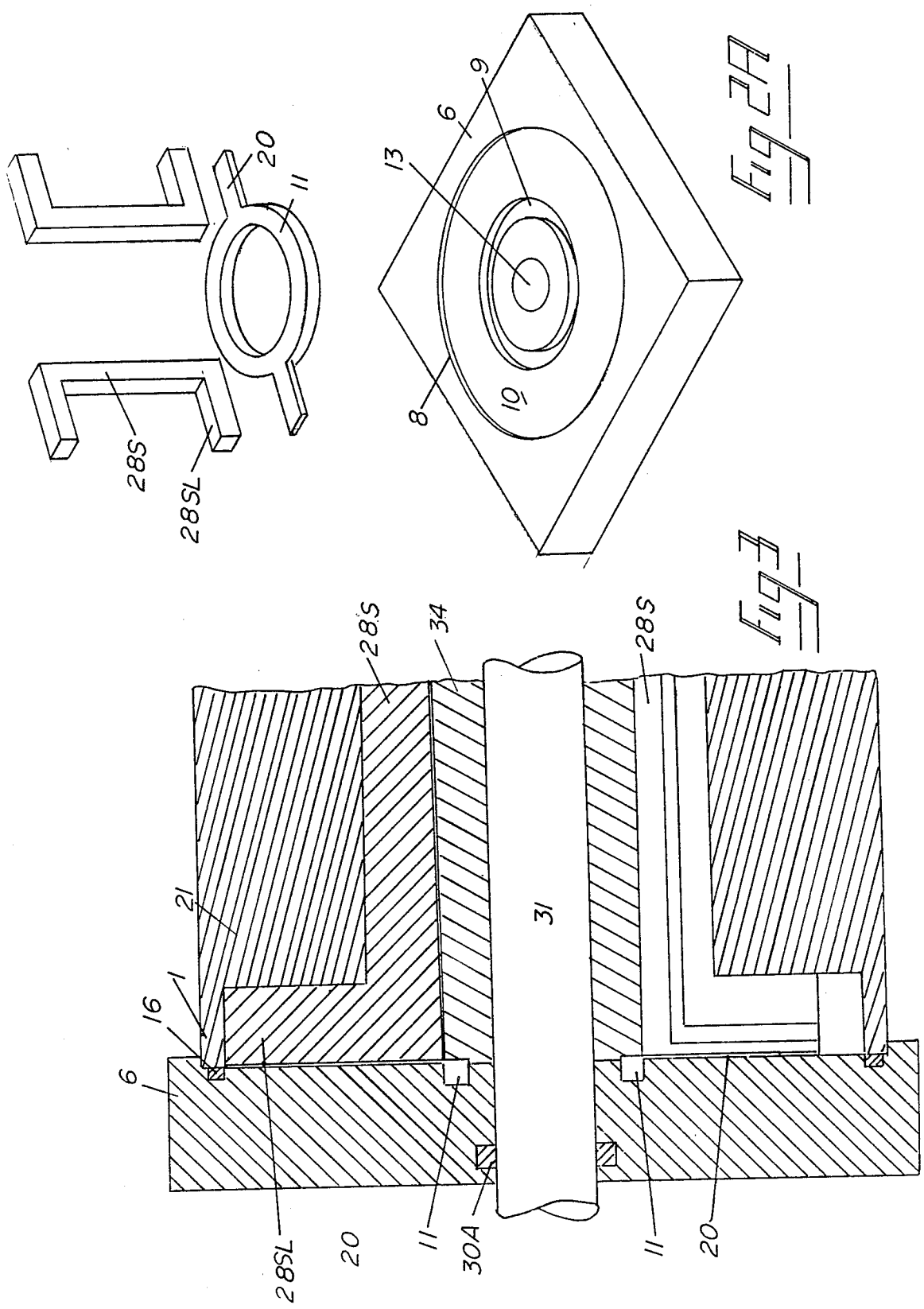

ACTUATOR SEAL ARRANGEMENT

BACKGROUND OF THE INVENTION

The present invention relates, in general, to seal arrangements and more particularly relates to seal arrangements useful in fluid motors as stator seal means useful in connection with stator seals for use with fluid actuated rotary motor arrangements adapted to provide reciprocatory rotary motion through a portion of a cycle. Rotary motion devices have numerous applications including opening and closing valves, toggling and providing other services where push/pull or reciprocatory movements are involved.

In general actuators of the type previously described include a housing with head walls, where the housing defines a chamber in which a shaft is connected to a vane to provide rotary response to a shaft which carries the vane and the shaft extends through the housing and out through the housing head. The vane member is cycled to and fro by the pressure of a fluid emitted to one side and then the other side of the vane within the chamber and the concurrent exhaust of fluid at the opposite side. Stator arrangements are generally provided in such devices to define one side of the chamber and, in some instances, multi stators are provided in order to define more than one chamber. Previous vane type rotary type actuators have generally been distinguished by the fact that they require frequent servicing and replacement of seals due to wear.

Additionally effective sealing has been a problem in such devices and fluid leakage around the seals has been particularly troublesome.

In general the prior art arrangements have generally provided seal arrangements for pneumatic systems where the leakage rate has been in the the order of 0.1 standard cubic feet per minute and in some instances considerably higher leak rates are common.

Considerable improvment has been achieved by arrangements shown in U.S. Pat. No. 4,475,738 in U.S. Pat. No. 4,474,105 and the present invention provides some improvment even in the operation of devices provided by the aforenoted Patents.

Additional prior art arrangements are shown in the U.S. Pat. No. 3,128,679 wherein a rotary device is shown with a housing defining a chamber, a vane and seal arrangement which includes internal seal from around the inner end of a shaft bore where the shaft passes through the head of the device. A somewhat similar arrangement is shown in U.S. Pat. No. 2,806,451 and U.S. Pat. No. 3,682,050 when both arrangments two piece vane seals are shown. Additional arrangements for vane type actuators are shown in U.S. Pat. No. 3,131,610 where a seal arrangement is provided around the entire pheriphery of a vane. In U.S. Pat. No. 3,179,020 where split vane is provided.

No prior seal arrangement known for an actuator device where a ring seal is provided including a tab arrangement to extend radially outwardly from the ring to engage a seal member of an associated stator to prevent leakage therebetween.

SUMMARY OF THE INVENTION

The present invention relates in general to a novel seal member arrangement for an actuator which includes a housing, with a stator extending radially therefrom to a termination point where a groove is provided around the edge of the stator and where an end plate is provided to be received by the housing. The housing has a central aperture to receive a shaft which carries a vane and is provided to engage a portion of a seal member received along the longitudinal edge of the stator member. An annular ring is provided in spaced aligned relation from the end aperture and a seal member is provided to be received in the groove of the housing. The ring seal member is adapted to engage the seal member of the stator member and has a tab extending radially outwardly from the seal member parallel to the groove in the side of the stator member so that the stator member seal engages the tab.

It has been found that in some instances considerable seal leakage occurs in the arrangements of the type previously described where the stator abuts the joint between the seal member of stator and the ring seal member of the end wall of the housing. Additionally, it has further been found that by use of a seal arrangement in accordance with the present invention, leakage which may otherwise occur at the point of commonality between the stator and the end wall is virtually eliminated.

It has been further unexpectedly found that by use of a seal arrangement in accordance with the present invention to seal leaks at the stator greater seal tolerance can be allowed in other areas so the "break away" torque which is required to begin movement of the shaft and a vane member which may be carried by the shaft member is substantially reduced and that more efficient operation of the arrangement in ensues.

Further, it has been found that use of seals in accordance with the present invention greatly facilitate assembly of fluid motor devices.

A seal arrangement for use in a rotary actuator having a housing and an end wall where a shaft extends through an aperture in the end wall and and carries a vane, a stator assembly is provided and directed inwardly from the housing having an end edge in adjacent relation with the end wall and a longitudinal edge adjacent the shaft. A groove is provided extending longitudinally along the end edge and the longitudinal edge and is adapted to receive a generally rectangular stator seal member so the stator seal member end edge abuts the end wall to provide a fluid seal therebetween and where an annular groove is provided around the shaft receiving aperture and is adapted to recieve a generally circular ring seal. The generally circular "O" ring seal may be of selected cross section includes a tab member having a thickness less than the thickness of the "O" ring member and the tab extends radially outwardly from the "O" ring member parallel to the groove of the end edge to engage the stator seal member.

Arrangements within the scope of the present invention are illustrated and described hereinafter by way of example only and not by way of limitation. It will be understood that various other arrangments also within the scope of the present invention will occur to those skilled in the art upon reading the disclosure set forth hereinafter.

BRIEF DESCRIPTION OF THE DRAWINGS

In the examples in accordance with the present invention illustrated hereinafter:

FIG. 1 is an exploded perspective view of an arrangement in which devices of the present invention are useful;

FIGS. 2A-2C present is a perspective views of an example use of a seal arrangement within the scope of the present invention; and FIG. 3 is an elevational view of one example of a seal arrangement within the scope of the present invention in a sealing environment.

DETAILED DESCRIPTION OF THE DRAWINGS

Figure 2C:
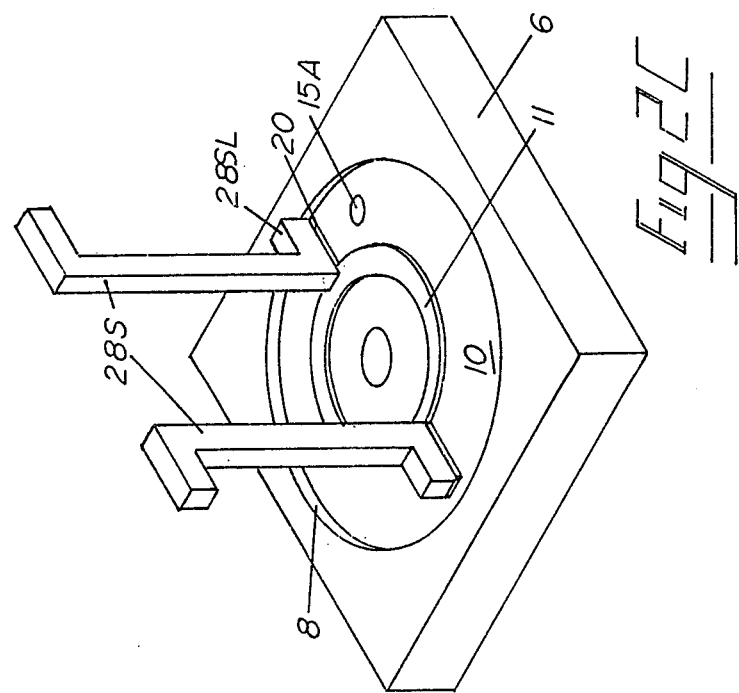

Referring first to FIG. 1 which shows an exploded view of one arrangement within the scope of the present invention for 90 degree rotation of the shaft similar to that shown in our U.S. Copending application Ser. No. 910,626 filed 9/23/86, where a cylindrical body 1 is shown defining an internal chamber 2 to receive the elements illustrated in exploded form.

Body 1 can be fabricated from any suitable material and in the example shown can be extruded aluminum or plastic material. The body can also be fabricated by other means such as machining.

As previously discussed the Figures illustrate an arrangement where open ends are provided at opposite ends of the housing but it will be understood that arrangements where one end is closed are also within the scope of the present invention.

Heads 6 and 7 are provided at opposite ends of body 1 and each includes an annular groove 8 (the corresponding annular groove and inner side configuration of head 6 not being shown) it being understood that heads 6 and 7 are the same in that each includes aligned grooves similar to groove 8 of head 6 adapted to receive the end of body 1 opposite the end receiving head 7 a sealing ring 16 is provided where body 1 is received in heads 6 and 7 in sealing relation on seals 16.

A second internal groove 9 is provided in each head 6, 7 inset from a central shaft opening 13 as described hereinafter. A recessed bearing surface 10 is provided in each head inside groove 8 to receive the seals of a rotor vane and stator as described hereinafter. Central aperture 13 is provided in each head 6, 7, and is adapted to receive a rotor described herein where in assembled form apertures 13 are in longitudinally aligned relation to receive opposite ends of a shaft 31 of a rotor assembly as described hereinafter. A peripherial internal groove 30 can be provided in each of the central apertures 13 of each head 6 and 7 to receive a ring seal 30A to prevent inward migration of grit or other contaminates.

Each head 6, 7 is provided with communicating fluid inlet/outlet 15-15A to communicate with chamber 2 to provide admisssion and exhaust of operating fluid when the unit is assembled to move the vane and rotor shaft. In FIG. 1, aperture 15 is shown communicating with an aperture 15A in head 7. A similar fluid inlet/outlet is provided in head 6 but is not shown where only opening 15 of head 6 is shown.

A rotor assembly 36 is provided with, for example, vanes 37 extending outwardly from an enlarged seal portion 34 of generally circular outer peripherial configuration and carried intermediate the ends of shaft 31. While an arrangement is shown in FIG. 1 providing two vanes other arrangements providing single or multiple vane arrangements are also included within the scope of the present invention for use in devices operable between other limits where the number of vanes implies the use of a selected number of stators as discussed hereinafter.

The surface of enlarged portion 34 provides a stator vane sealing surface and extends along a portion of the length of shaft 31 which is approximately equal to the length of body 1 so ends 34A and 34B of enlarged portion 34 abut seals 11 of heads 6, 7, when the unit is assembled as described hereinafter. Each vane 37 includes grooves 38 around the free periphery thereof adapted to receive channel shaped sealing members 28 as described hereinafter.

In the arrangement shown cross bores 24A are provided to extend through enlarged portion 34 and shaft 31 to facilitate application of fluid pressure to opposite sides of the vane as is known in the art.

A pair of stators 21 are provided within housing 2 and and can be extruded as part of body 1 or can be secured to body 1 by bolting or other suitable means. As indicated in the example of FIG. 1 stators 21 can be an integral part of the housing with free edges at opposite ends thereof which are located, respectively, adjacent the inner surface of heads 6, 7, and an outer edge which is located adjacent the surface of enlarged portion 34. Each stator 21 is generally the same length as body 1 and provides a longitudinal edge groove 22 which extends the length of each stator. Laterally extending side grooves 22A extend radially toward the outer surface of body 1. Channel shaped seals 28S are provided to be received in grooves 22, between the inner surface of the stator and body 1 to prevent fluid leakage between chambers provided in body 1 by the vanes and seals. Also each groove 22A of each stator 21 is adapted to receive a depending leg 28SL of channel shaped sealing member 28 where legs 28SL terminate in a pad 29. The legs 28SL of the stotor seals can have longitudinal recesses, or not, to receive tabs 20 of rings 11 when the unit is assembled.

A longitudinally extending groove 25 can be provided in each side of each stator 21 where one of the grooves 25 is adapted to be positioned in aligned relation with an aperture 15A of one head 6, 7, to facilitate selective admission/emission of fluid to an from chamber 2.

The unit is assembled and held by bolts 27 shown in FIG. 1 which have threaded ends 27A, 27C received in holes 7A of heads 6 and 7 and extend between heads 6 and 7 with body 1 therebetween to receive nuts 27B on threaded ends 27C.

Lobes 33 are provided as an integral part of body 1 and extend generally the length thereof to receive bolts 27 in openings 33A defined by the lobes.

Referring to FIG. 2A a perspective view of a sealing arrangement is shown with a seal 11 in accordance with the present invention is shown which can be adapted to be received in groove 9 of head 6 and 7. Seal 11 as shown is ring shaped and has laterally extending tab members 20 which are received on the outer surface 10 of the heads 6 and 7 and the legs of the seals 28S and pads 29.

Referring again to FIG. 2A ring seal 11 is shown having thickness "T" which is determined in accordance with the depth of the groove 9 of the heads 6 and 7. Within the scope of the present invention the dimensions, orientation, and configuration of the various elements of the seal member can be modified to accommodate various design features of the stator and end wall of the particular actuator to which the seal is to be applied.

In the arrangements shown the tabs 20 extend radially outwardly from the member 11 and have a surface which is flush with the surface 11A of the ring 11 in some applications the surface may be either below or above the surface 11A.

Likewise the width D of the tabs 20 can be varied to accommodate various configurations and designs of rotary actuator heads and stator.

FIG. 2A is also an illustration of the application of seal member 11 where head 6 and seal members 28S are shown in free form relation in order to prevent unnecessary complication of the illustration and description of the application seals 11. The seal 11 is shown in FIG. 2A in relation to be received within the groove 9 of the head 6 with the tabs 20 resting on the surface 10. The stator seals 28S are shown so that when they are positioned, for example by placement of the head 6 on a body 1 as shown in FIG. 1, with the stator received within the openings of the stator seal 28S the legs 28SL will engage the tabs 20.

Figure 2B:
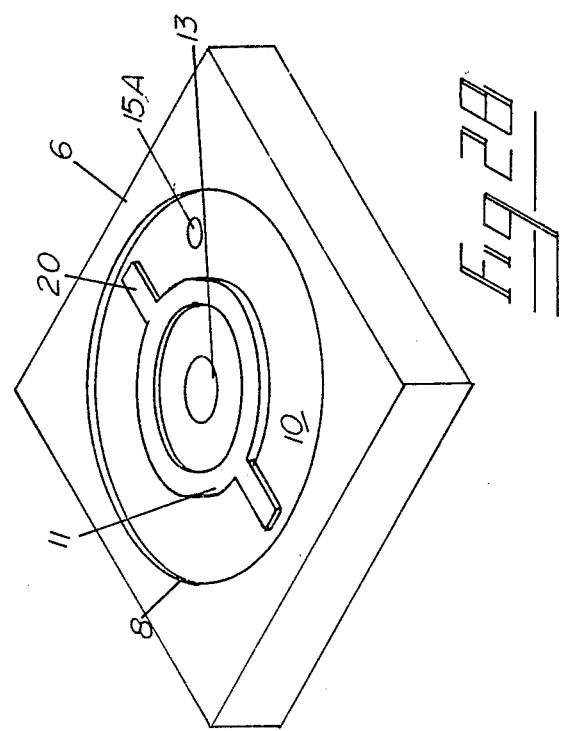

FIG. 2B is a perspective illustration of the location of the seal member 11 within groove 9 of a head 6 and with the tab members 20 extending radially outwardly therefrom resting on the surface 10.

FIG. 3 is an illustration showin the orientation of the seal member 28S with respect to the tabs 20 of seal ring 11 and it can be seen that the leg 28SL actually engages the tab 20.

Finally, FIG. 3 is a cross sectional elevation view of an assembled arrangement utilizing a seal ring 11 of the type provided by the present invention. In FIG. 3 head 6 has been located on a body 1 with the stator 21 extending downwardly therefrom to receive the stator seal 28S. The tab 11 extends between the stator seal 28SL and surface 10 of the head 6 as previously described. It will be seen that the shaft 31 extends through the aperture 30 with the seal 30A in position.

Notable at location 55 the tab 20 of seal 11 prevents any opening at the end of the junction between the seal 28SL and the sealing portion 14 of the shaft 31 as previously stated.

In accordance with the present invention it has been found that the arrangement shown is particularly useful in connection with the operation of rotary vane and as also previously described reduces leakage in such arrangements and further facilitates the assembly of such devices.

It will be understood that the foregoing is one example of an arrangement within the scope of the present invention and that various other arrangements also within the scope of the present invention will occur to those skilled in the art upon reading the disclosure set forth hereinbefore.

The invention claimed is:

1. A seal arrangement for use in a rotary actuator having a housing and an end wall where a shaft extends through an aperture in the end wall, the shaft carries a vane located in the housing and, a stator assembly is provided and directed inwardly from the housing having an end edge in adjacent relation with the end wall and a longitudinal edge adjacent the shaft; groove means are provided extending longitudinally along the end of the end edge and along the longitudinal edge and adapted to receive a generally channel shaped stator seal member where the stator seal member in the area of the end edge abuts the end wall to provide a fluid seal therebetween and where an annular groove is provided in the end wall around the shaft receiving aperture and adapted to recieve a generally circular ring seal, and where ring seal includes a radially outwardly extending tab member having a thickness less than the thickness of the ring member and extends parallel to the groove of the end edge to engage the stator seal member.

2. The invention of claim 1 wherein said ring member is of generally rectangular cross section.

3. The invention of claim 1 wherin said stator seal is of generally rectangular cross section.

4. The invention of claim 3 wherein the portion of said stator seal adjacent said stator end edge has a recess extending along a portion of the outer edge thereof adapted to receive said tab member.

5. The invention of claim 1 wherein said ring member is of circular cross section.

* * * * *